United States Patent
Kameda et al.

[11] Patent Number: 5,939,216
[45] Date of Patent: Aug. 17, 1999

[54] FIBER REINFORCED CERAMIC MATRIX COMPOSITE AND METHOD OF MANUFACTURING THE SAME

[75] Inventors: Tsuneji Kameda, Tokyo; Shoko Suyama, Yokohama; Yoshinori Hayakawa, Machida, all of Japan

[73] Assignee: Kabushiki Kaisha Toshiba, Kawasaki, Japan

[21] Appl. No.: 08/646,854

[22] Filed: May 8, 1996

[30] Foreign Application Priority Data

May 10, 1995 [JP] Japan ..................................... 7-112174

[51] Int. Cl.$^6$ ....................................... B32B 9/00
[52] U.S. Cl. ......................... 428/698; 428/699; 428/323
[58] Field of Search .................... 428/698, 699, 428/323

[56] References Cited

U.S. PATENT DOCUMENTS

| | | |
|---|---|---|
| 4,613,473 | 9/1986 | Layden et al. . |
| 5,015,540 | 5/1991 | Borom et al. . |
| 5,021,367 | 6/1991 | Singh et al. . |
| 5,112,545 | 5/1992 | Spain et al. . |
| 5,619,903 | 4/1997 | Rogers et al. ................ 87/7 |

FOREIGN PATENT DOCUMENTS

| | | |
|---|---|---|
| 0 399 548 A2 | 11/1990 | European Pat. Off. . |
| WO 92/00182 | 1/1992 | WIPO . |

OTHER PUBLICATIONS

European Patent Office, Patent Abstracts of Japan, Publication No. JP4224176, Aug. 13, 1992, "Production of Inorganic Structural Body".

*Primary Examiner*—Deborah Jones
*Assistant Examiner*—Jason Savage
*Attorney, Agent, or Firm*—Finnegan, Henderson, Farabow, Garrett & Dunner, L.L.P.

[57] ABSTRACT

A fiber reinforced ceramic matrix composite is disclosed which comprises a ceramic matrix and a fiber preform integrally assembled therein, the fiber preform comprising a braided fabric derivable from braiding a yarn which is composed of a plurality of fiber bundles formed of a plurality of monofilaments bundled together, the braided fabric being present in a volume fraction of fiber (Vf) of 10 to 40% by volume based on the total volume of the ceramic matrix composite. The yarns (fiber bundles) may preferably be disposed in oblique relation to each other. Initial matrix cracking strength, crack propagation resistance and fracture energy are greatly increased. Fiber preforms having a complicated shape can be easily obtained.

9 Claims, 8 Drawing Sheets

FIBER REINFORCED CERAMIC MATRIX COMPOSITE AND METHOD OF MANUFACTURING THE SAME

BACKGROUND OF THE INVENTION

1. Field of the Invention

The present invention relates to fiber reinforced ceramic matrix composites and also to a method of manufacturing these composites. More particularly, the invention is directed to a fiber reinforced ceramic matrix composite having great reliability and enhanced initial cracking strength characteristics by bringing the constituent ceramic fibers into a braided structure and to a method of the manufacture of such ceramic matrix composite.

2. Description of the Related Art

Ceramic sintered bodies have found wide applications to electronic and structural parts for use in heavy electric components, aircraft components, automobile components, electronic components, precision machinery components, semiconductor device materials and the like. This is because such sintered bodies are generally less deteriorative in strength in the course of molding up to elevated temperatures and are excellent in hardness, electrical resistance, abrasion resistance, heat resistance, corrosion resistance, lightweight and the like as compared to conventional metallic materials.

Those ceramic sintered bodies, however, are smaller in tensile stress than in compression stress, and they are prone to cause undesirable brittleness, i.e. a phenomenon in which cracking readily proceeds under tensile stress. To render ceramics applicable to those parts for which high reliability is required, a keen demand has been voiced for the development of a ceramic sintered body having improved toughness and increased fracture energy.

More specifically, great reliability coupled with sufficient heat stability and high-temperature strength properties are required for ceramic structural parts for use as components of gas turbines, aircraft and automobiles. In order to meet these requirements, intensive researches have been made in an effort to commercialize a ceramic matrix composite (CMC) that could afford increased values of fracture toughness and fracture energy and sufficient thermal shock resistance and that could result from bringing composite materials such as fibers made of inorganic material or metal, whiskers, plates, particles and the like into a matrix sintered body in which the composite materials are held in a compositely dispersed manner.

In a fiber reinforced ceramic matrix composite formed by compositely dispersing the above ceramic fibers in a matrix sintered body, greatly improved cracking resistance is attainable. To increase this property, however, the fibers need to be incorporated in a relatively large amount into the matrix. Further, a preform derived or formed by weaving the ceramic fibers with each other in a plane or three-dimensional direction is employed as a fibrous structure so as to reduce anisotropy inherent to ceramic matrix composites.

In fabricating the aforementioned fiber reinforced ceramic matrix composite into various structural parts, it is desired that such composite be sufficiently great in initial matrix cracking strength, highly resistant to propagation of any crack arisen and moreover large in fracture energy.

In the case where stress applied or exerted to the ceramic matrix composite is lower than the initial matrix cracking strength, the composite so stressed is elastically deformable and substantially free from damage such as cracking and the like. Under these stress conditions, such composite offers to a full extent good environmental resistance peculiar to ceramics and involves no physical deterioration with time which would stem from propagation of damage taking place at an initial stage. Consequently, gaining the initial matrix cracking strength of a ceramic composite at a higher level is a significantly important requirement for designing parts. From standpoints of increased reliability and damage acceptability of the parts, the ceramic matrix composite should also importantly be great in its fracture energy.

However, high initial matrix cracking strength and large fracture energy are virtually difficult to simultaneously attain with conventional fiber reinforced ceramic matrix composites. That is, the resistance to crack propagation is smaller as the initial matrix cracking strength is higher with the result that the fracture energy is necessarily limited to a certain small value. Conversely, the initial matrix cracking strength tends to drop in the case of a conventional ceramic matrix composite having large fracture energy. The conventional ceramic matrix composites in any event fail to satisfy both initial matrix cracking strength and fracture energy in a well-balanced manner. This leaves the problem that they are applicable only for a largely limited range of fields.

As another drawback of the conventional ceramic composites, the strength characteristics and the like become objectionably anisotropic, depending upon the direction of orientation of fibrous structure-constituting fibers, thus leading to a part of physical instability as a whole. This is particularly true of a ceramic matrix composite having disposed in its ceramic matrix a fibrous structure resulting from laminating a plurality of fabrics one on the other. Such known ceramic matrix composite shows a sharp decline in interlaminar strength.

On the other hand, the ceramic fibers constituting the fibrous structure generally get easily impaired upon flexing or rubbing, resulting in breakage or fluffing of the fiber-constituting monofilaments. Hence, it is made difficult to provide a preform (fibrous structure) of a complicated shape such as a plane or three-dimensional fabric.

SUMMARY OF THE INVENTION

With the foregoing problems of the prior art in view, the present invention has for one of its objects to provide a fiber reinforced ceramic matrix composite that exhibits increased initial matrix cracking strength, crack propagation resistance and fracture energy and improved interlaminar strength, and enables a fiber preform of a complicated shape to be relatively easily formed. Another object of the invention lies in providing a method of the manufacture of such a ceramic matrix composite.

To achieve these objects, the present inventors have produced various fiber preforms using a variety of methods to thereby form ceramic matrix composites, making comparative research into the effects of methods and structures of the fiber preforms upon the strength characteristics, initial matrix cracking strength and fracture energy in particular, of the ceramic matrix composites. As a result of this researches, it has been found that when filament-bundled fiber bundles are braided into a fabric of a given shape and then compositely assembled at a predetermined volume fraction of fiber in a ceramic matrix, the resulting composite is extremely easy to form a fiber preform and also is excellent in initial cracking strength.

When a fabric element derived from braiding a fiber bundle as a braiding yarn is formed into a fiber preform by further braiding, stitching, three-dimensional orthogonal weaving, plain weaving or the like, the fibers used can be oriented in a more complicated fashion with consequential increase in crack propagation resistance after initial breakage or cracking of the matrix.

When the fabric element so obtained is increased in its thickness, a fiber preform is made easily available which is suited for the particular shape of a part with eventual rise in interlaminar strength of the resultant ceramic matrix composite. To be more specific, the use of a thick fabric leads to reduced number of fabric lamination in providing the part of a given thickness. A fiber preform may also be formed of a single-ply fabric. This composite can be maintained with its brittle regions decreased by reduced lamination number of the fabric as noted above.

When a braided fabric is derived from a fiber bundle composed of a plurality of organic fibers and of ceramic fibers, followed by carbonization of only the organic fibers into a matrix-forming material, the volume fraction of fiber in the ceramic matrix composite to be obtained is easily adjustable. Moreover, a matrix sintered body is producible at a region where the organic fibers were originally present so that a matrix can be disposed densely around the ceramic fibers. In such instance, a ceramic composite having high breaking resistance is obtainable. This invention has now been completed through the findings discussed hereinbefore.

The fiber reinforced ceramic matrix composite according to the present invention comprises a ceramic matrix and a fiber preform integrally assembled therein, the fiber preform being formed of a braided fabric which is composed of a plurality of fiber bundles formed of a multiplicity of monofilaments bundled together, the braided fabric being present in a volume fraction of fiber (Vf) of 10 to 40% by volume in that ceramic matrix composite.

The fiber bundles constituting the braided fabric may preferably be oriented in oblique relation to each other. The ceramic matrix can be formed of a silicon carbide (SiC) ceramics derived by reaction sintering. Included in the braided fabric may be a middle-end-yarn which is made greater in its Young's modulus than the yarn. Moreover, the diameter of the middle-end-yarn may be set larger than that of the yarn.

The fiber preform, comprised of a plurality of fabric elements obtainable by braiding of a fiber bundle as a braiding yarn, is so formed as to be in the form of either one of a braiding, a stitching, a three-dimensional orthogonal weave and a plain weave of each fabric element.

The fabric element may preferably be formed of a flat braid in a strip-like shape or of a tubular braid in a flattened shape.

Over the surface of the filament may be applied, by means of CVD, PVD or the like, a sliding layer composed of either one or both of carbon (C) and boron nitride (BN) and having a thickness of 0.1 to 5 $\mu$m. To prevent the filament and matrix material from getting reacted with each other, a barrier layer may also preferably be provided in such a manner as to cover the sliding layer. This barrier layer is composed of a material different from that of the sliding layer, which material is at least one member selected from among silicon carbide (SiC), carbon (C), molybdenum (Mo) and molybdenum silicide ($MoSi_2$).

Various ceramic sintered bodies can be employed for formation of the matrix of the fiber reinforced ceramic matrix composite according to the present invention. For instance, those sintered bodies are selected from non-oxide sintered ceramics such as silicon carbide (SiC), aluminum nitride (AlN), silicon nitride ($Si_3N_4$), Si—Al—O—N, boron nitride (BN) and the like, and oxide sintered ceramics such as alumina ($Al_2O_3$), zirconia ($ZrO_2$), titania ($TiO_2$), mullite ($3Al_2O_3.2SiO_2$), beryllia (BeO), kozelite, zircon, spinel ($MgAl_2O_4$) and the like. These materials may be used alone or in combination. Particularly preferred is a matrix formed with use of a sintered body of densely prepared reaction bonding silicon carbide (RB-SiC), and the ceramic composite using this matrix can exhibit increased initial matrix cracking strength and superior environmental resistance.

Various sintering assisting agents or additive such as yttrium oxide, alumina, cerium oxide, magnesium carbonate, calcium carbonate and silicon oxide (silica) may be added, as required, to the ceramic material powder for use in forming the above sintered body. The matrix can also be formed by reaction sintering.

In order to gain improved toughness of the ceramic matrix composite, the braided fabric for assembly in the matrix is constituted to have a volume fraction of fiber (Vf) specified above. This braided fabric is made available from braiding of a fiber bundle as a yarn, which bundle is formed of 100 to 10,000 monofilaments bundled together. Although no particular restriction is imposed upon the material of monofilaments, those ceramic fibers which are employed for the matrix may suitably be used. The examples of the ceramic fibers may include silicon carbide-based fibers (SiC, Si—C—O, Si—Ti—C—O and the like), SiC-covered fibers (for example, C for a core wire), alumina fibers, zirconia fibers, carbon fibers, boron fibers, silicon nitride-based fibers, $Si_3N_4$-covered fibers (for example, C for a core wire), mullite fibers ($3Al_2O_3.2SiO_2$— $2Al_2O_3.SiO_2$) and the like. At least one member of these ceramic fibers may be used for the practice of the present invention.

The diameter and length of a ceramic fiber have significant effects on the orientation and volume fraction in the molding structure and also on the strength properties of the composite product. A continuous fiber of 3 to 150 $\mu$m in diameter is useful in the invention. If the diameter is not more than 3 $\mu$m, then the fiber used is in the vicinity of or smaller than the particle size of a corresponding matrix and less effectively composite. When the diameter of the fiber exceeds 150 $\mu$m, stress easily cause at an interface between the fiber and the matrix owing to the difference in thermal expansion between the fiber and the matrix, eventually resulting in cracking or otherwise impaired matrix. In either case, great composite effectiveness is difficult to achieve.

The above stated ceramic fiber (monofilament) is bundled in a number of about of 100 to 10,000 into a fiber bundle, which bundle is thereafter braided into a braided fabric or a fabric element.

DESCRIPTION OF THE PREFERRED EMBODIMENTS

With reference to the drawings, the braided fabric to be used in the present invention is firstly described hereunder.

Figure 1:
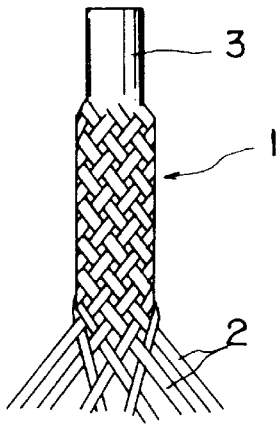
FIG. 1 is a front elevational view showing the manner in which a cylindrical braided fabric is being produced.

FIG. 1 is a front elevational view showing the manner in which a cylindrical braided fabric 1 (fiber preform) is being produced by braiding. The braided fabric 1 having a braiding structure is formed by braiding a yarn 2 (fiber bundle) being supplied from a carrier of a braider such that this yarn is obliquely disposed to wind over the surface of a mandrel 3 (core).

Figure 2:
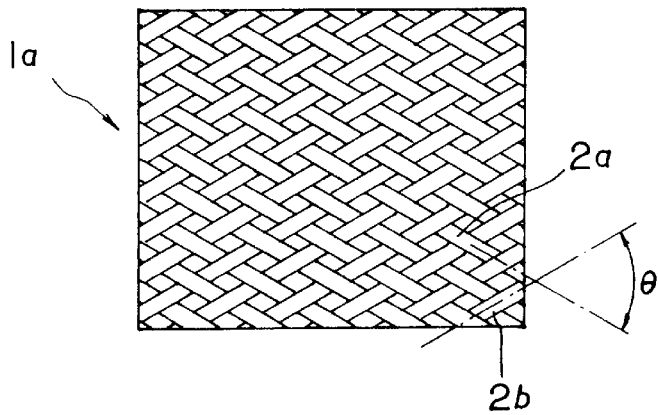
FIG. 2 is a plan view of one preferred embodiment of a braid.

FIG. 2 is a plan view illustrative of a braided fabric. Fiber bundles 2a and fiber bundles 2b are crossed an angle of intersection of about 60 degrees so that a braided fabric 1a is provided.

Figure 3:
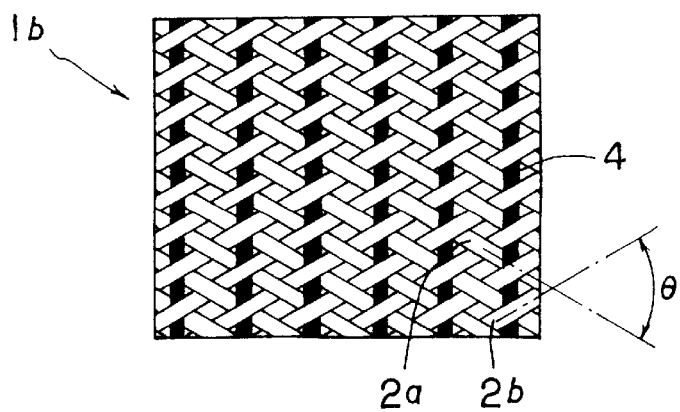
FIG. 3 is a view similar to FIG. 2, but showing another embodiment of a braided fabric.

FIG. 3 is a plan view illustrative of another braided fabric. A middle-end-yarn 4 is further subjected into the braided fabric of FIG. 2 to thereby obtain a braided fabric 1b.

Figure 4:
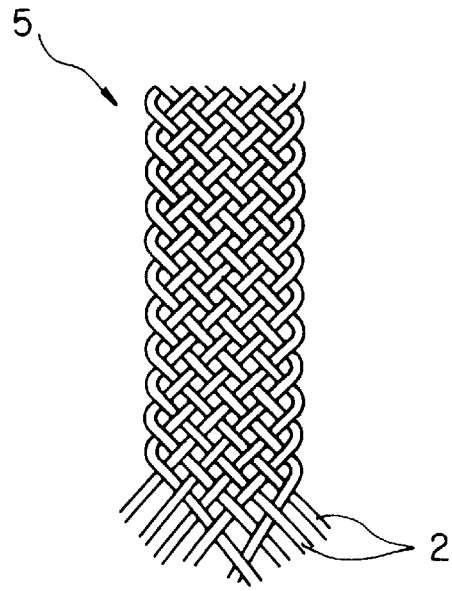
FIG. 4 is a plan view of one preferred embodiment of a flat braid.

FIG. 4 is a plan view illustrating a flat braid 5. This braid is formed in a plain shape with 9 pieces of fiber bundles 2 braided. At least 5 pieces of fiber bundles are required to produce this type of the flat braid 5.

Figure 5:
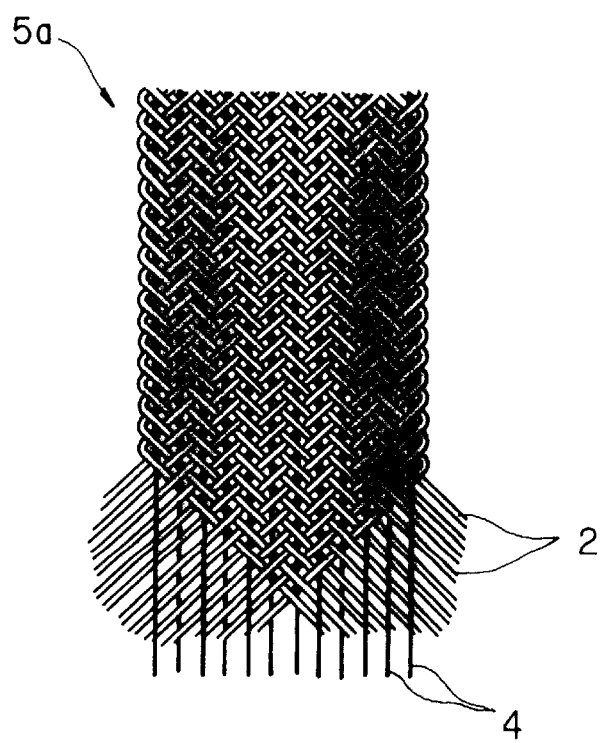
FIG. 5 is a view similar to FIG. 4, but showing another embodiment of a flat braid.

FIG. 5 is a plan view illustrating a flat braid 5a. This braid is formed in a plain shape with 25 pieces of fiber bundles 2 and 12 pieces of middle-end-yarns subjected to braiding.

Figure 6:
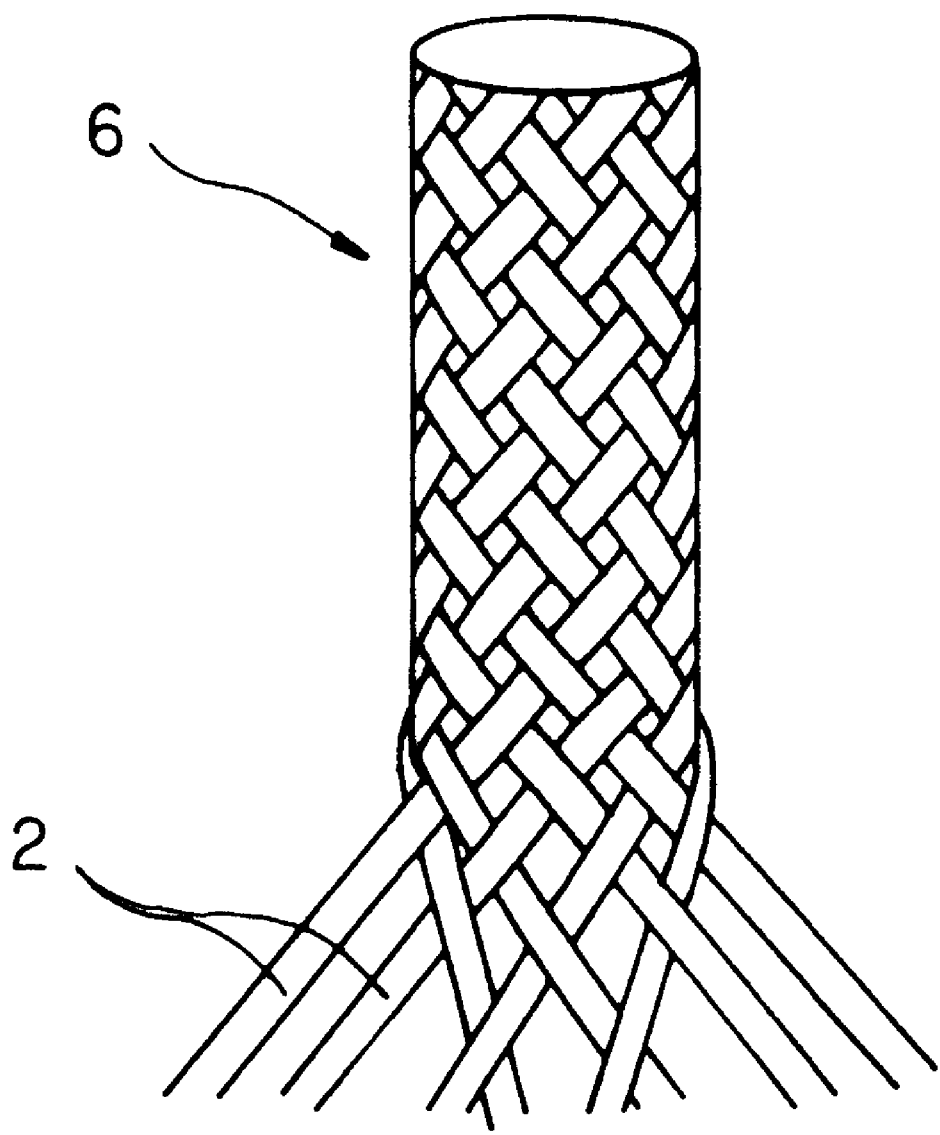
FIG. 6 is a perspective view showing the manner in which a tubular braid is being produced.

FIG. 6 is a perspective view of a tubular braid 6. This braid is formed in a cylindrical shape in which 8 pieces of fiber bundles 2 are braided.

Figure 7:
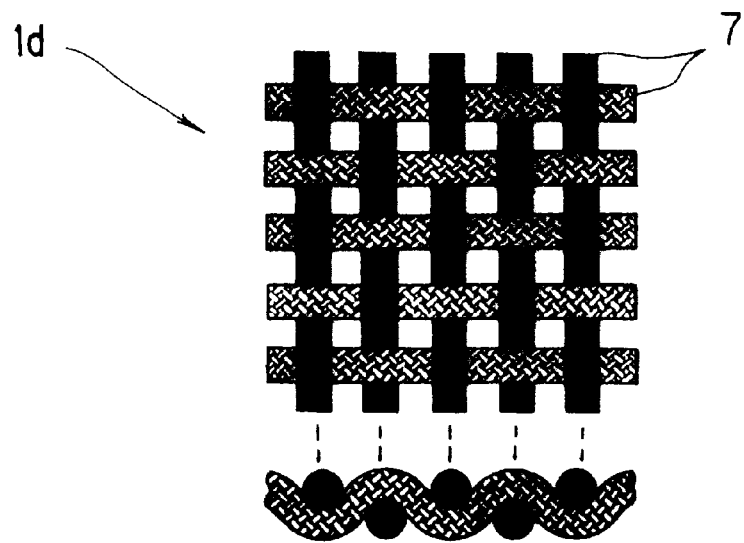
FIG. 7 is a view of a fiber preform produced from a fabric element once formed by braiding and further brought into a plain weave.
Figure 8:
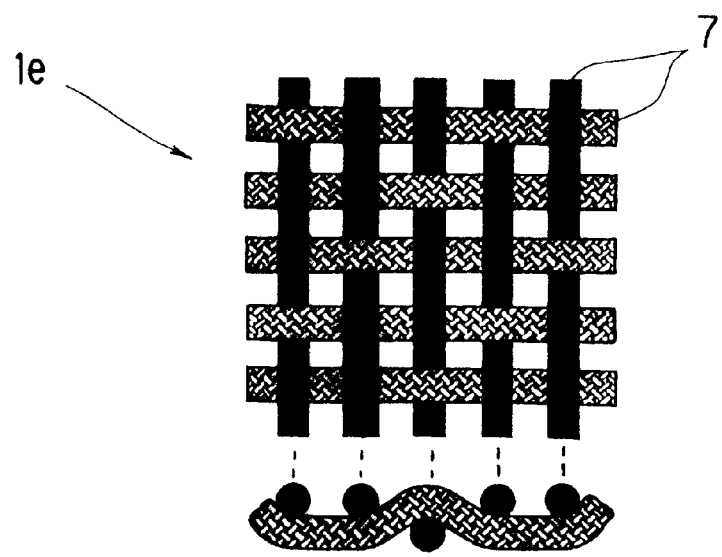
FIG. 8 is a view of a fiber preform produced from a fabric element once formed by braiding and further brought into a twill weave.
Figure 9:
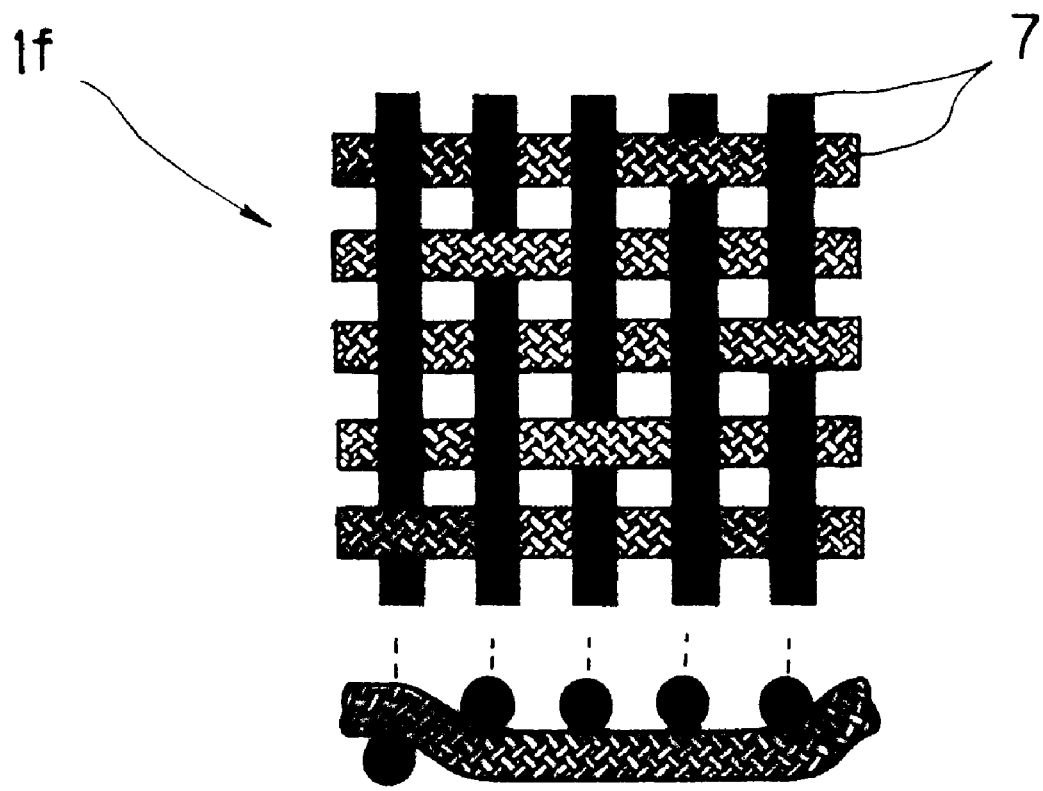
FIG. 9 is a view of a fiber preform produced from a fabric element once formed by braiding and further brought into a satin weave.

Fiber preforms for use in the present invention may also be produced, with use of a plurality of braided fabrics stated above as starting elements (fabric elements), in a planar or three-dimensional structure. FIGS. 7 to 9 show fiber preforms resulting from weaving braiding-derived fabric elements into a planar structure.

A fiber preform 1d shown in FIG. 7 is formed by weaving a plurality of fabric elements 7, 7 in a plain weave. In this preform, warpwise and weftwise fabric elements 7, 7 are woven in alternately intersected at every other pieces. The fiber preform 1d is abundant in the number of intersected warpwise and weftwise fabric elements 7, 7 and hence dense and hard in nature.

A fiber preform 1e shown in FIG. 8 is formed by weaving a plurality of fabric elements 7, 7 in a twill weave. In this preform, more than 2 pieces of warpwise or weftwise fabric elements 7 are aligned or placed in parallel and intersected with other fabric elements. The twill weave of fiber preform 1e is soft and stretchable as compared with the above plain weave of fiber preform 1d.

A fiber preform 1f of FIG. 9 is formed by weaving fabric elements 7, 7 in a satin weave. In this preform, more of warpwise or weftwise fabric elements 7 are aligned with intersected portions scattered. The satin weave of fiber preform 1f is by far softer than the above twill weave of fiber preform 1e.

The softness of the fiber preforms make it easy to form the fiber preform so as to have a desirable shape.

Figure 10:
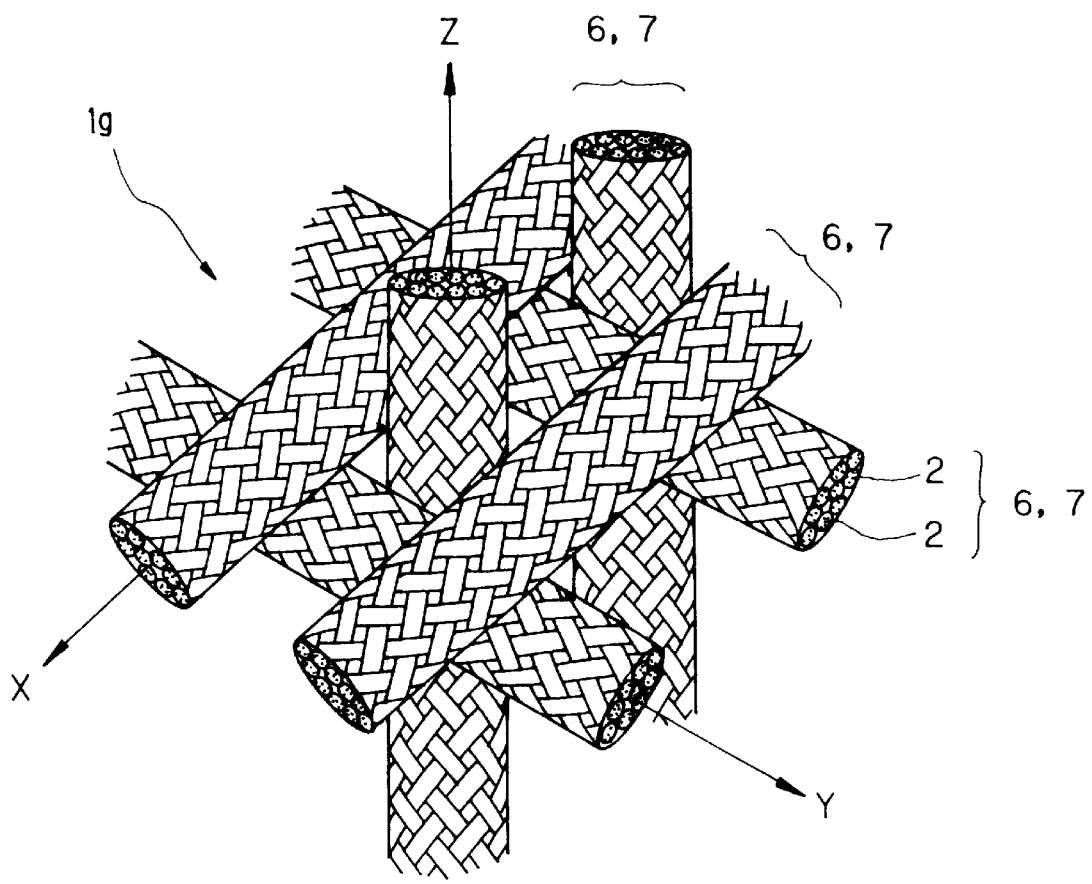
FIG. 10 is a view of a fiber preform produced from a fabric element once formed by braiding and further brought into a three-dimensional orthogonal weave.
Figure 11:
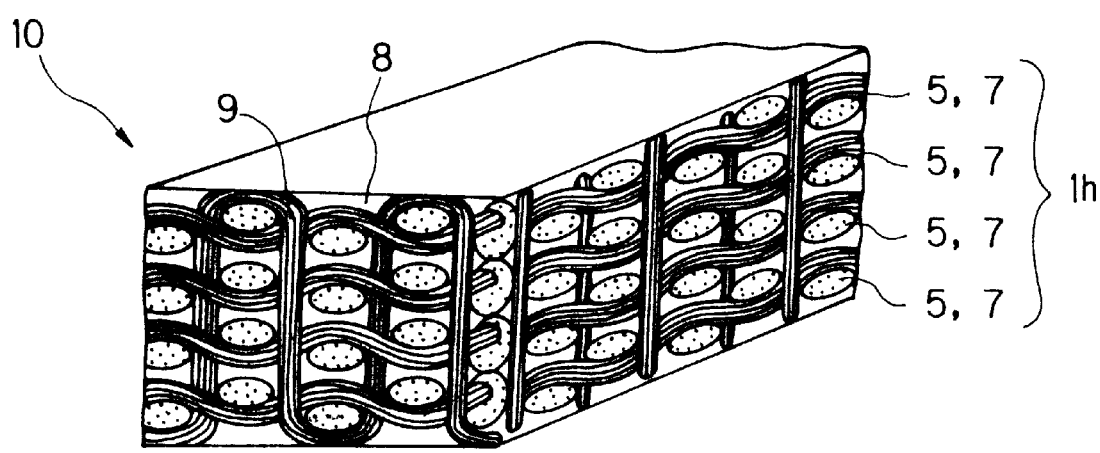
FIG. 11 is a perspective, cross-sectional view of a fiber reinforced ceramic matrix composite constituted with a ceramic matrix and a fiber preform having a stitching structure integrally assembled therein.

In FIGS. 10 and 11, respectively, are shown fiber preforms formed by weaving fabric elements in a three-dimensional structure. A fiber preform 1g of FIG. 10 is derived from use of tubular braids as in FIG. 6 as fabric elements 7 and weaving of the latter in a three-dimensional structure with the fabric elements positioned in directions of X-, Y- and Z-axis where the latter are rectangularly disposed with each other.

FIG. 11 is a perspective, cross-sectional view of a fiber reinforced ceramic matrix composite 10 in which a fiber preform 1h of a stitching structure has been assembled in a ceramic matrix 8. In this composite, flat braids 5 shown for example in FIG. 5 are laminated as fabric elements 7 into a 4-ply form, and the resulting laminate is integrally sewn in the matrix by means of a stitching fiber bundle 9 made to run in a direction of thickness.

Conventional plain weaves are equivalent to the case where yarns (fiber bundles) are disposed at an angle of intersection of 90 degrees. This limited angle is inherent to such known plain weaves. Thus, a ceramic matrix composite with such conventional plain weave is frequently problematic in respect of its anisotropic strength properties.

In the braided fabrics to be used in the present invention, the fiber bundles 2a and the fiber bundles 2b are not rectangularly arranged with each other at an angle of 90 degrees as in the conventional plain weave, but in oblique relation to each other at a selected intersection angle of about 10 to 170 degrees as shown in FIGS. 2 and 3. Consequently, as seen in FIG. 1, the braided fabric with its fiber bundles obliquely disposed is sufficiently resistant, via those oblique fiber bundles 2, to hoop stress liable to arise mainly radially or to principal stress liable to occur axially. Moreover, the braided fabric 1 can withstand stress flowing from during assembly thereof into the matrix and some stress occurring while in sintering of the resulting matrix, thus contributing greatly to improved shape retention of the braided fabric itself as well as the composite product which has desirably controlled anisotropic properties.

According to the present invention, fiber preforms (braided fabrics) or fabric elements are derived by braiding, and hence, the ceramic fibers are free from damage such as breakage and fluffing. Fiber preforms even of a complicated shape can be easily formed. Namely, the conventional plain weaves are experienced with repeated flexing of the fabric fibers at process sites at which to reciprocate a weft shuttle and to operate weft yarns and hence with repeated fiber-to-fiber rubbing.

In contrast, in the case of a mode of braiding according to the invention, the continuous fiber bundles are allowed to wind around a mandrel into a given fibrous structure so that fiber-to-fiber rubbing takes place solely at the time of intersection of the fibers. This reduces flexing and rubbing of the fibers and alleviates breakage and fluffing of the latter, whereby there can be provided a ceramic matrix composite with great reliability and good shape retention.

In the case where a braided fabric is integrally assembled in a matrix made up of a reaction sintered ceramics (ex. SiC), the volume fraction of fiber of the braided fabric in the resulting composite can be adjusted with ease by the use of fiber bundles as yarns, which bundles are composed of a plurality of organic fibers and ceramic fibers bundled together (doubled together), or by the use of braided fabrics composed of organic fibers and ceramic fibers blended together.

As suitable organic fibers used here, polyester yarns and polyethylene yarns are preferred which are easily decomposable by heat treatment prior to synthesis or formation of the matrix. Further, it is also preferable to use continuous organic fibers each having a diameter of substantially equal to that of the ceramic fiber.

The organic fibers used above as auxiliary fibers are carbonized by heat treatment before matrix synthesis, and the carbonized organic fibers are utilized as a source of carbon for synthesis of a SiC matrix. In consequence, the organic fibers adherent to the ceramic fibers are converted to a SiC matrix, so that the matrix can be sufficiently formed also around the ceramic fibers. This gives few portions where the ceramic fibers are held together, or few spaces where the ceramic fibers are absent, thus enabling to produce a ceramic matrix composite with excellent strength properties.

In order to attain improved breaking resistance at an interface between the ceramic fibers and the matrix, the interfacial structure should be of a micro nature. For this reason, it is not adequate to set the diameter of the ceramic fibers to a larger extent even when a fiber preform is produced by braiding, and ceramic fibers of a smaller diameter are generally employed. However, when such thin ceramic fibers are woven into a fiber preform of a given thickness, considerably prolonged braiding time is needed, and the productivity of the composite is liable to be lowered. What is worse, the fiber preform itself becomes dense and hence invites an excessive volume fraction of fiber in the resulting composite, thus resulting in reduced strength properties of the composite.

As a countermeasure of this problem, ceramic fibers are used in combination with organic fibers such that the latter act as spacers for the former. The organic fibers after being carbonized as mentioned above are used as a source of carbon for the synthesis of a SiC matrix. Hence, the matrix is sufficiently provided in between the ceramic fibers, whereby the strength properties of the resulting composite can be greatly improved. The volume fraction of fiber (Vf) of the fiber preform can be easily controlled or adjusted also by varying the combining ratio of organic fiber to ceramic fiber.

In the braided fabric 1b having the middle-end-yarns 4 disposed to connect the warpwise fiber bundles 2a and the weftwise fiber bundles 2b as shown in FIG. 3, the physical properties of that fabric can be adjusted in the direction in which the middle-end-yarns 4 are arranged. Since the middle-end-yarns 4 are less susceptible to flexing, their Young' moduli can be set at a higher level than those of the braiding yarns 2a, 2b. The yarns 4 are only slightly flexed even when subjected to external force at the time of impregnation of a starting matrix slurry into the braided fabric, so that the shape of the braided fabric can be retained with high precision.

In addition, least flexing of the middle-end-yarns 4 enables their fabric diameter to be larger than that of the braiding yarns 2a, 2b and gives efficient inhibition of cracking or damage against propagation, hence providing a ceramic matrix composite with increased crack propagation resistance. Furthermore, the yarns 4 serve as spacers in between the fibers and render efficiently producible a braided fabric with reduced number of lamination of the fiber bundles. The capability of the yarns 4 to act as the spacers is also effective in adjusting the volume faction of fiber.

As stated above, because the intersection angle of each group of braiding yarns and the presence and absence of the middle-end-yarns 4 are easily selectively controlled, the fibers can be arranged to suit the particular applications and physical requirements of a part to be made of the composite.

The middle-end-yarns 4 are disposed at a substantially flexing-free portion where the fiber bundles are intersected with each other. Therefore, even if the middle-end-yarns 4 are composed of fibers of a higher Young' modulus or of a larger diameter, they are subjected to least breakage. Accordingly, the middle-end-yarns 4 are effective to improve the strength of the fiber preform itself, and at the same time, to enhance the mechanical strength of the resulting composite in its entirety.

To prevent the ceramic fibers and the matrix from reacting with each other and to improve sliding of these constituents at an interface, it is preferable to dispose over the surface of the ceramic fiber a sliding layer in a thickness of about 0.1 to 5 $\mu$m. This sliding layer can be formed by coating carbon (C) or boron nitride (BN) onto surfaces of the ceramic fiber.

By the use of the sliding layer, the bonding strength between the ceramic fibers and the matrix can be held at an optimum level, and therefore, the strength after initial cracking can be maintained to a great degree. Thus, a ceramic matrix composite is attainable with high toughness.

The braided fabric (fiber preform) formed by braiding is provided and composed in a matrix at a volume fraction of fiber (Vf) of more than 10% with respect to the total volume of the corresponding composite. However, too large a Vf of above 40% renders it difficult to uniformly dispose the matrix around each of the constituent fibers, inviting a sharp drop in the strength properties of the resulting composite which results from defects such as void spaces (pores) and the like. Accordingly, for obtaining an excellent composite effects, suitable volume fractions of fiber are in the range of 10 to 40% by volume.

The fiber reinforced ceramic matrix composite in which a braided fabric is provided in a matrix may be produced, for example, by the following method. Fiber bundles constituted with a plurality of monofilaments bundled together are braided into a fiber preform, which is then impregnated with a starting matrix slurry so as to form a structure, and followed by sintering to bring the matrix and fiber preform into an integral structure.

When use is made of a fiber bundle composed of organic fibers and ceramic fibers bundled together and when a matrix is formed by reaction sintering, the structure obtained by the above method is heated in an atmosphere of any suitable inert gas to thereby carbonize the organic fibers. The structure is then made to be impregnated with fused silicon, after which the silicon and carbon components are subjected to reaction sintering, whereby a silicon carbide (SiC) matrix is formed.

In the fiber reinforced ceramic matrix composite constituted as stated above and the method of its manufacture, the fiber preform (braided fabric) is derived by braiding method and hence can be prevented from damage such as breakage and fluffing of the ceramic fibers and can be easily formed even in a complicated shape.

The braided fabric to be used in the present invention has a braiding structure and is optionally adjustable in its intersection angle of yarns. Thus, the constituent fibers can be disposed effectively in the direction in which principal stress tends to take place in a part. Accordingly, the part composed of the ceramic matrix composite using this braided fabric is highly reliable.

The above braided fabric has the warpwise fiber bundle and weftwise fiber bundles disposed in oblique relation to each other. Therefore, even when the braided fabric is exerted by external force, all of the oblique fiber bundles can withstand such external force, and enable to prevent the deformation of the braided fabric. Therefore, the braided fabric is highly resistant to stress occurred during impregnation of a starting matrix slurry into the braided fabric, or to some stress occurred during sintering of the matrix. This ensures that both the braided fabric itself and the resulting composite should retain their respective shapes with high precision.

In a case where a braided fabric is provided in the matrix formed of a reaction sintered SiC ceramics, when the fiber bundles composed of a plurality of organic fibers and ceramic fibers bundled together (doubled together) are used as braided fabric-constituting fiber bundles, the volume fraction of fiber of the braided fabric in the resulting composite can be adjusted or controlled with ease.

The above stated organic fibers are carbonized by heat treatment before synthesis of the matrix and further employed as a source of carbon for synthesis of a SiC matrix by reaction sintering. Consequently, the organic fibers adherent to the ceramic fibers are converted to a SiC matrix, so that the matrix is sufficiently formed also around the ceramic fibers. This feature gives least portion in which the ceramic fibers are contacted together or least void (pore) in which the ceramic fibers or the matrix are absent. Hence, there can be provided a desired composite having excellent strength properties.

The following examples are given to further illustrate the present invention.

EXAMPLE 1

Continuous SiC ceramic fibers of 14 μm in diameter (trade name: Hi-Nicalon, mfd. by Nippon Carbon Co., Ltd.) were prepared as monofilaments for a composite of Example 1. On the surface of each such fiber was provided by means of CVD a sliding layer composed of boron nitride (BN) and having a thickness of 0.6 μm. Around the sliding layer was also disposed a barrier layer in a thickness of 0.5 μm by coating of silicon carbide (SiC) through CVD.

Figure 12:
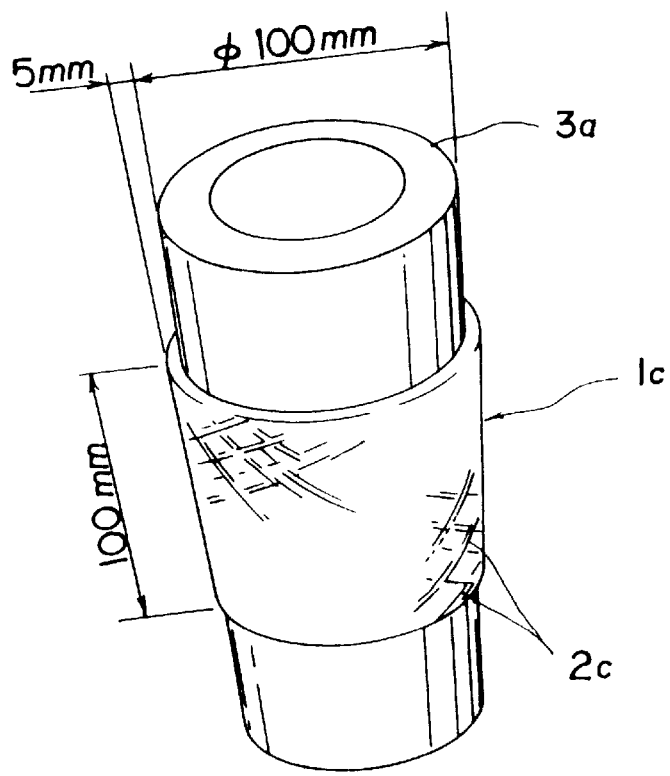
FIG. 12 is a perspective view of a braided fabric used in the examples described later.

Next, polyester fibers were prepared which were of the same diameter as that of the above SiC ceramic fibers carrying thereon both the sliding layer and the barrier layer. The polyester fibers and SiC ceramic fibers were doubled together in a number ratio of 1:1, and a fiber bundle (yarn) was prepared which contained a total of about 1,000 fibers. The resulting fiber bundle was mounted on a braider equipped with 48 carriers. As shown in FIG. 12, the fiber bundle 2c was allowed to wind around a hollow cylindrical core 3a (mandrel) of 100 mm in outer diameter at an angle of intersection of 60 degrees. In this way, many fiber preforms 1c (braided fabrics) were prepared which were sized to be 110 mm in outer diameter, 100 mm in inner diameter and 100 mm in length and were of a 7-ply with braiding structure.

A mixture was prepared which was composed of 70% by weight of particulate SiC of 1 to 3 μm in center particle size, 10% by weight of carbon black as a carbon source, 15% by weight of water-soluble phenol resin and 5% by weight of polycarbosilane. The mixture in an amount of 50% by weight, 49% by weight of water and 1% by weight of a surfactant were uniformly mixed to prepare a starting matrix slurry.

Each of the above braided fabrics was set in a porous mold made of resin, and the matrix slurry was impregnated under pressure into the braided fabric by means of pressure casting, whereby a fiber-containing ceramic structure was obtained. The volume fraction of fiber (Vf) in a densely sintered body of the composite was set at 32% as listed in Table 1 below.

Subsequently, the fiber-containing ceramic molding structure was dried and heated at 1,000° C. for 5 hours in an inert gas (Ar gas) atmosphere so as to carbonize the polyester fibers and phenol resin contained in such molding structure and to thermally decompose the polycarbosilane also contained in such structure. Thereafter, the resulting structure was put in an alumina board filled with particulate Si in an amount of 1.2 times the amount of Si required for silicification, followed by heating at 1,450° C. for 5 hours in a sintering oven maintained in vacuum condition, so that such structure was reaction-sintered while fused Si was being impregnated thereinto. A dense matrix composed of sintered SiC was synthesized from which a SiC ceramic matrix composite 10a of Example 1 having a cylindrical shape as shown in FIG. 13 was obtained.

Figure 13:
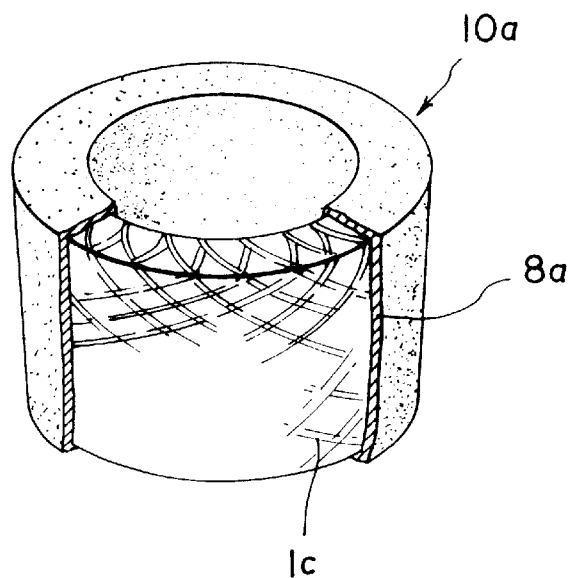
FIG. 13 is a perspective view, partly broken, of a SiC ceramic matrix composite of a cylindrical shape taken in connection with those examples.

As shown in FIG. 13, the composite 10a has a structure in which a braided fabric 1c made up of continuous SiC fibers has been integrally assembled in a matrix 8a composed of reaction sintered SiC.

The cylindrical composite so produced was highly dense with a density of 2.8 g/cm$^3$. A plate-like specimen was cut out of this composite for inspection of the inner structural details. It has been ascertained that a SiC matrix has been densely and uniformly formed around the ceramic fibers. The three-point bending strength of the specimen was determined to be as high as 280 to 310 MPa. From this result, the composite 1a has been found to cause no readily full propagation of breakage even when exerted by cracking and also to afford a metastable cracking behavior required for composites.

EXAMPLE 2

The procedure of Example 1 was followed except that the SiC ceramic fibers and polyester fibers were doubled together in a number ratio of 1:3, and the volume fraction of fiber was varied at 12%. As the result, a SiC ceramic matrix composite of Example 2 was obtained.

EXAMPLE 3

The procedure of Example 1 was followed except that a braided fabric having continuous SiC ceramic fibers and polyester fibers bundled together in a number ratio of 1:⅓ was used, and the volume fraction of fiber was set at 38%. As the result, a SiC ceramic matrix composite of Example 3 was obtained.

COMPARATIVE EXAMPLE 1

The procedure of Example 1 was followed except that a fiber bundle having continuous SiC ceramic fibers and polyester fibers doubled together in a number ratio of 1:6 was used, and the volume fraction of fiber was changed at as low as 5%. As the result, a SiC ceramic matrix composite of Comparative Example 1 was obtained.

COMPARATIVE EXAMPLE 2

The procedure of Example 1 was followed except that a fiber bundle having continuous SiC ceramic fibers and polyester fibers bundled together in a number ratio of 1:⅙ was used, and the volume fraction of fiber was changed at as high as 47%. As the result, a SiC ceramic matrix composite of Comparative Example 2 was obtained.

EXAMPLE 4

Continuous SiC ceramic fibers of 14 μm in diameter (trade name: Hi-Nicalon, mfd. by Nippon Carbon Co., Ltd.) were prepared as monofilaments for a composite of Example 4. On the surface of each such fiber was provided by means of CVD a sliding layer composed of boron nitride (BN) and having a thickness of 0.6 μm. A fiber bundle (yarn) was prepared as a yarn containing about 500 fibers. The Young's modulus of the fiber bundle was set at 270 GPa.

Monofilaments of continuous SiC ceramic fibers of 14 μm in diameter (trade name: SCS-9, mfd. by Textron Inc.) were prepared as a middle-end-yarn. On the surface of each such monofilament was disposed a surface-improving layer containing BN and having a thickness of 3 μm. The Young's modulus of the middle-end-yarn was set at 374 GPa.

The above yarn and middle-end-yarn were mounted on a braider equipped with 48 carriers. As seen in FIG. 12, the yarn was allowed to wind around a core of 100 mm in outer diameter, while the middle-end-yarn was being disposed. In this way, many fiber preforms (braided fabrics) were prepared which were sized to be 110 mm in outer diameter, 100 mm in inner diameter and 100 mm in length and were of a 7-ply with braiding structure.

Each of the above braided fabrics was set in a porous mold made of resin. Thereafter, the starting matrix slurry prepared in Example 1 was impregnated under pressure into the braided fabric by means of pressure casting, whereby a fabric-containing ceramic structure. The amount of impregnation of the matrix slurry was set such that the volume fraction of fiber (Vf) of a densely sintered body was at 35% as shown in Table 1.

Subsequently, the fiber-containing ceramic molding structure was dried and put in an alumina case filled with particulate Si in an amount of 1.2 times the amount of Si required for silicification, followed by heating at 1,450° C. for 5 hours in a sintering oven maintained in vacuum condition, so that such structure was reaction-sintered while fused Si was being impregnated thereinto. As the result, a SiC ceramic matrix composite of Example 4 having a cylindrical shape composed of sintered SiC was obtained.

The resulting composite was highly dense with a density of 2.8 g/cm$^3$. A plate-like specimen was cut out of this composite for minute examination of the inner structure. A SiC matrix was uniformly and densely formed around the ceramic fibers. With use of a specimen cut such that the middle-end-yarn was located in parallel to the direction along which to conduct tensile testing, the three-point bending strength was determined to be as high as 340 to 410 MPa. The composite of this example has been proved to involve no readily full breakage even upon exposure to cracking and to afford a metastable cracking behavior required for composites.

EXAMPLE 5

The procedure of Example 4 was followed except that a fiber bundle having continuous SiC ceramic fibers and polyester fibers doubled together in a number ratio of 1:1 was used, and the volume fraction of fiber was varied at 18%. As the result, a SiC ceramic matrix composite of Example 5 was obtained.

COMPARATIVE EXAMPLE 3

The procedure of Example 4 was followed except that a fiber bundle having continuous SiC ceramic fibers and polyester fibers doubled together in a number ratio of 1:3 was used, and the volume fraction of fiber was changed at as low as 6%. As the result, a SiC ceramic matrix composite of Comparative Example 3 was obtained.

COMPARATIVE EXAMPLE 4

The fiber bundle (yarn) prepared in Example 4 and composed of continuous SiC ceramic fibers was plain-woven at a weave density of 12 yarns per one inch to thereby form a cloth, and this cloth was laminated one on the other into a conventional fiber preform. Subsequent formation of a matrix was done under the same conditions as in Example 4, whereby the fiber preform and matrix were integrally assembled together. As the result, a SiC ceramic matrix composite of Comparative Example 4 was obtained.

To evaluate the breaking characteristics of the composites produced in Example 1 to 5 and of the composites produced in Comparative Examples 1 to 4, a specimen was cut out of each of the composites for bending testing. Measurement was made of density, initial cracking strength and fracture energy at room temperature (RT: 25° C.). The numerical value of fracture energy was computed from the stress-strain curve with the fracture energy of Comparative Example 1 taken as reference standard 1. Magnifications against the reference standard were calculated and indicated as the relative numerical values. The results are listed in Table 1.

TABLE 1

| | FIBER PREFORM | | PROPERTY OF COMPOSITE | | | |
| --- | --- | --- | --- | --- | --- | --- |
| SPECIMEN NO. | WEAVING | MIDDLE-END-YARN | VOLUME FRACTION OF FIBER Vf (%) | DENSITY (g/cm$^3$) | INITIAL CRACKING STRENGTH (MPa) | FRACTURE ENERGY |
| EXAMPLE 1 | BRAIDING | ABSENT | 32 | 2.8 | 280~310 | 24 |
| EXAMPLE 2 | BRAIDING | ABSENT | 12 | 2.9 | 290~320 | 19 |
| EXAMPLE 3 | BRAIDING | ABSENT | 38 | 2.8 | 260~300 | 25 |
| COMPARATIVE EXAMPLE 1 | BRAIDING | ABSENT | 5 | 2.9 | 350~370 | 1 (REFERENCE STANDARD) |
| COMPARATIVE EXAMPLE 2 | BRAIDING | ABSENT | 47 | 2.7 | 170~200 | 15 |
| EXAMPLE 4 | BRAIDING | PRESENT | 35 | 2.8 | 340~410 | 27 |

TABLE 1-continued

| | FIBER PREFORM | | PROPERTY OF COMPOSITE | | | |
|---|---|---|---|---|---|---|
| SPECIMEN NO. | WEAVING | MIDDLE-END-YARN | VOLUME FRACTION OF FIBER Vf (%) | DENSITY (g/cm³) | INITIAL CRACKING STRENGTH (MPa) | FRACTURE ENERGY |
| EXAMPLE 5 | BRAIDING | PRESENT | 16 | 2.9 | 350~420 | 23 |
| COMPARATIVE EXAMPLE 3 | BRAIDING | PRESENT | 6 | 2.9 | 390~460 | 3 |
| COMPARATIVE EXAMPLE 4 | PLAIN WEAVING | ABSENT | 30 | 2.8 | 250~280 | 16 |

As is evident from Table 1, high initial cracking strength and high fracture energy, hence improved reliability, are attainable from the composites resulting from use of a braided fabric as a fiber preform and having a volume fraction of fiber (Vf) of 12 to 38%. Especially, as regards Examples 4 and 5 in which a braided fabric was provided with a middle-end-yarn, the strength of the fibrous structure itself is greatly increased with the result that the initial cracking strength of the composite is markedly improved.

In contrast, too small a volume fraction of fiber, i.e. the composites of Comparative Examples 1 to 3, invites small fracture energy even with use of a braided fabric, leading to brittleness failure. Too large a volume fraction of fiber, i.e. the composite of Comparative Example 2, fails to sufficiently form a matrix around the ceramic fibers, revealing a sharp decline in initial cracking strength. In the composite of Comparative Example 4 in which a laminate of plain-woven cloth was used as a fiber preform, the fibers themselves are anisotropic in regard to strength even with a volume fraction of fiber as high as 30%, and hence, the composite as a whole is insufficient as to cracking resistance. Further, Comparative Example 4 shows frequently broken fiber, needing further research on cloth weaving and the like so as to improve productivity.

EXAMPLE 6

Continuous SiC ceramic fibers of 14 μm in diameter (trade name: Hi-Nicalon, mfd. by Nippon Carbon Co., Ltd.) were prepared as monofilaments for a composite of Example 6. On the surface of each such fiber was provided by means of CVD a sliding layer composed of boron nitride (BN) and having a thickness of 0.4 μm. Around the sliding layer was further disposed a 0.4 μm-thick barrier layer by coating of silicon carbide (SiC) through CVD.

A fiber bundle (yarn) was prepared which contained about 500 fibers each having a sliding and a barrier layer. By the use of the resulting fiber bundle, a tubular braid was formed which was composed of 24 yarns and 12 middle-end-yarns. The tubular braid was pressed into a flattened shape to thereby prepare a fabric element. This fabric element was braided as a yarn around a core (mandrel) of 100 mm in outer diameter and 100 mm in length, after which a braided fabric of increased thickness was provided. This braided fabric had 24 yarns (devoid of middle-end-yarns). Subsequently, a fiber preform of 110 mm in outer diameter, 100 mm in inner diameter and 5 mm in thickness was prepared by laminating the above braided fabric into a 3-ply form.

A mixture was prepared which was composed of 70% by weight of particulate SiC of 1 to 3 μm in center particle size and 30% by weight of carbon black as a carbon source. The mixture in an amount of 50% by weight, 47% by weight of pure water and 3% by weight of a surfactant was uniformly mixed to prepare a starting matrix slurry.

The above fiber preform was set in a porous mold made of resin. The matrix slurry was impregnated under pressure into the fiber preform by pressure casting, whereby a fiber-containing ceramic structure was provided. The volume fraction of fiber (Vf) in a densely sintered body was set at 27% as shown in Table 2 below.

The fiber-containing ceramic structure was dried and put in an alumina case filled with particulate Si in an amount of 1.2 times the amount of Si required for silicification, followed by heating at 1,430° C. for 5 hours in a sintering oven maintained in vacuum condition, so that such structure was reaction-sintered while fused Si was being impregnated thereto. A dense matrix composed of densely sintered SiC was synthesized. Thus, a SiC ceramic matrix composite of Example 6 was obtained.

The resulting composite of Example 6 has a structure in which a fiber preform formed of continuous SiC ceramic fibers has been integrally assembled in a matrix composed of reaction sintered SiC.

The cylindrical composite of this example had a high density of 3.0 g/cm³. Examination was made of the inner structure of a specimen cut out of the composite. A SiC matrix was uniformly and densely formed around the ceramic fibers. The three-point bending strength of the specimen was determined to be as high as 190 to 430 MPa. It has been found that the composite here causes no readily full breakage even when cracking occurs and has a metastable cracking behavior required for composites.

EXAMPLE 7

Continuous SiC ceramic fibers of 14 μm in diameter (trade name: Hi-Nicalon, mfd. by Nippon Carbon Co., Ltd.) were prepared as monofilaments. A 0.4 μm-thick sliding layer composed of boron nitride (BN) was disposed on each such fiber by means of CVD.

Using the fibers so treated, a fiber bundle (yarn) was prepared which had about 500 fibers bundled together. A tubular braid constituted with 6 yarns and 24 middle-end-yarns was formed by the use of such fiber bundle. This tubular braid was pressed into a flattened shape to thereby prepare a fabric element. Thereafter, the fabric element was braided as a yarn on to a core (mandrel) of 100 mm in outer diameter and 100 mm in length. A braided fabric of increased thickness was formed which was made up of 24 yarns (devoid of middle-end-yarns). This thick braided fabric was laminated in a 3-ply form into a fiber preform of 110 mm in outer diameter, 100 mm in inner diameter, 100 mm in length and 5 mm in thickness.

The fiber preform thus obtained was set in a porous mold made of resin. The matrix slurry prepared in Example 6 was impregnated under pressure into the fiber preform by pressure casting to thereby provide a fiber-containing ceramic structure. The volume fraction of fiber (Vf) of a densely sintered body was set at 27% as shown in Table 2.

Next, the above structure was dried and put in an alumina case filled with particulate Si in an amount of 1.2 times the amount of Si required for silicification, followed by heating 1,430° C. for 5 hours in a sintering oven maintained in vacuum condition. During this heat treatment, reaction sintering of the structure was conducted while fused SiC was being impregnated. A dense matrix composed of sintered SiC was synthesized. As the result, a SiC ceramic matrix composite of Example 7 was obtained.

The resulting composite is of a structure in which a fiber preform constituted with continuous SiC ceramic fibers has been integrally assembled in a matrix composed of reaction sintered SiC.

The cylindrical composite of this example showed a density as high as 3.0 g/cm$^3$. Examination was made of the inner structure of a specimen cut out of the composite. A SiC matrix was uniformly and densely formed around the ceramic fibers. The three-point bending strength of the specimen was determined to be high, say from 200 to 460 MPa. From these results, the composite here has been proved to cause no readily full breakage even when cracking occurs and to ensure a metastable cracking behavior generally required for composites.

COMPARATIVE EXAMPLE 5

Continuous SiC ceramic fibers were prepared which were similar to those used in Example 6 and treated to have a 0.4 μm-thick sliding layer composed of boron nitride (BN) by CVD. A fiber bundle (yarn) was prepared by the use of about 500 fibers bundled together and woven into a conventional plain structure to thereby form a plain weave which was then cut to pieces of a strip-like shape.

The strip-like plain weave was allowed to wind in 12-ply form around a core (mandrel) of 100 mm in outer diameter and 100 mm in length. A cylindrical fiber preform was provided which was sized to be 110 mm in outer diameter, 100 mm in inner diameter, 100 mm in length and 5 mm in thickness.

The resulting fiber preform was treated as in Example 6. Namely, a matrix slurry was impregnated under pressure into such preform to form a structure which was then dried and reaction-sintered while in impregnation of fused Si. As the result, a SiC ceramic matrix composite of Comparative Example 5 was obtained.

Specimens were cut out of the composites of Examples 6 and 7 and of Comparative Example 5. Density, initial cracking strength and ultimate strength by a three-point bending test at room temperature (25° C.) were checked. In addition, fracture energy and interlaminar shear strength were measured according to the load-deflection curve obtained from the three-point bending test. The results are shown in Table 2.

As is clear from Table 2, the composites of Examples 6 and 7, produced by the use of a fiber preform derivable from further braiding of a braided fabric element, are larger in initial cracking strength and also in crack propagation resistance, and are more than twice in effective fracture energy as compared to the composite of Comparative Example 5 in which a fiber preform of a conventional plain weave is employed.

Moreover, the composites of Examples 6 and 7 show more than a three-fold increase in interlaminar shear strength and more than a two-fold increase in ultimate strength, thus affording excellent strength characteristics and sufficient toughness.

The above examples illustrate a reaction sintered SiC matrix as a ceramic matrix. Similar superior results are attainable in the case of each of $Si_3N_4$, Si—Al—O—N, AlN, $Al_2O_3$, $ZrO_2$, $SiO_2$, mullite and spinel.

As described and shown hereinabove, in the fiber reinforced ceramic matrix composite and the method of its manufacture according to the present invention, it contemplates the use of a mode of braiding in forming a fiber preform (braided fiber), and therefore, has freedom from damage such as breakage and fluffing of ceramic fibers and enables easy formation of a fiber preform even of a complicated shape or profile.

Braided fabrics for use in the invention are of a braiding structure and hence selectively adjustable in respect of intersection angles of yarns. This makes it possible to effectively dispose fibers at those portions of a part which would become susceptible to stresses. Thus, composites using braided fabrics according to the invention enjoy high reliability.

In forming the above braided fabric, warpwise and weftwise fiber bundles are positioned in oblique relation to each other. Even when external force is exerted to the braided fabric, all of these oblique fibers act to resist that force, preventing such braided fabric from getting deformed. Hence, the braided fabric is highly resistant to stress prone to occur during impregnation of a matrix slurry to the former, or to shrinkage stress prone to occur during sintering of the matrix. This leads to improved shape retention of the fabric itself and the resultant composite.

In assembling the braided fabric with a matrix composed of reaction sintered silicon carbide, a plurality of organic fibers and ceramic fibers (doubled together) are used as a braided fabric-constituting fiber bundle. Therefore, the volume fraction of fiber of a braided fabric in the composite is easily controlled or adjustable.

The organic fibers used above are carbonized by heat treatment before matrix synthesis, but may be used as a carbon source for synthesis of a SiC matrix by reaction sintering. Consequently, since the organic fibers having been adherent to the ceramic fibers are converted to a SiC matrix,

TABLE 2

| SPECIMEN NO. | VOLUME FRACTION OF FIBER Vf (%) | DENSITY (g/cm$^3$) | THREE-POINT BENDING TEST AT ROOM TEMPERATURE | | | INTER-LAMINAR SHEAR STRENGTH (MPa) |
|---|---|---|---|---|---|---|
| | | | INITIAL CRACKING STRENGTH σ1 (MPa) | ULTIMATE STRENGTH σ2 (MPa) | EFFECTIVE FRACTURE ENERGY γ (kJ/m$^2$) | |
| EXAMPLE 6 | 27 | 3.0 | 190 | 430 | 7.0 | 26 |
| EXAMPLE 7 | 27 | 3.0 | 200 | 460 | 7.0 | 24 |
| COMPARATIVE EXAMPLE 5 | 27 | 3.0 | 110 | 210 | 3.0 | 7 | and the matrix is formed sufficiently around the ceramic fibers. This reduces portions in which ceramic fibers are intimately contacted with each other, thus contributing greatly to production of composites having improved properties.

What is claimed is:

1. A fiber reinforced ceramic matrix composite comprising a ceramic matrix and a fiber preform integrally assembled therein, said fiber preform comprising fabric elements, said fabric elements are derived from braiding a yarn which is composed of a plurality of fiber bundles formed of a plurality of monofilaments bundled together, said fiber preform being present in a volume fraction of fiber (Vf) of 10 to 40% by volume based on the total volume of the ceramic matrix composite, said fiber preform further including middle-end-yarns disposed at a flexing-free portion of said fiber preform where said fabric elements intersect with each other, wherein said fabric elements form said fiber preform by braiding, stitching, or by weaving a three-dimensional orthogonal weave, a plain weave, or a twill weave.

2. The fiber reinforced ceramic matrix composite according to claim 1, wherein said fiber bundles are disposed in oblique relation to each other.

3. The fiber reinforced ceramic matrix composite according to claim 1, wherein said ceramic matrix comprises a silicon carbide ceramic derived by reaction sintering.

4. The fiber reinforced ceramic matrix composite according to claim 1, wherein said middle-end-yarn has a Young's modulus greater than that of a remainder of said yarn other than said middle-end-yarn.

5. The fiber reinforced ceramic matrix composite according to claim 1, wherein said middle-end-yarn has a larger diameter than that of said yarn other than said middle-end-yarn.

6. The fiber reinforced ceramic matrix composite according to claim 1, wherein said fabric element is a flat braided strip.

7. The fiber reinforced ceramic matrix composite according to claim 1, wherein said fabric element is in the form of a tubular braid in a flattened shape.

8. The fiber reinforced ceramic matrix composite according to claim 1, wherein each of said monofilament is provided with a sliding layer, said sliding layer comprising at least one of carbon (C) and boron nitride (BN) and having a thickness of 0.1 to 5 $\mu$m.

9. The fiber reinforced ceramic matrix composite according to claim 8, wherein each of said monofilaments is provided with a barrier layer disposed over said sliding layer, said barrier layer comprising at least one of silicon carbide (SiC), molybdenum (Mo) and molybdenum silicide ($MoSi_2$).

* * * * *